April 18, 1939. G. J. MANNFOLK 2,155,055
STEERING APPARATUS
Filed Jan. 25, 1938
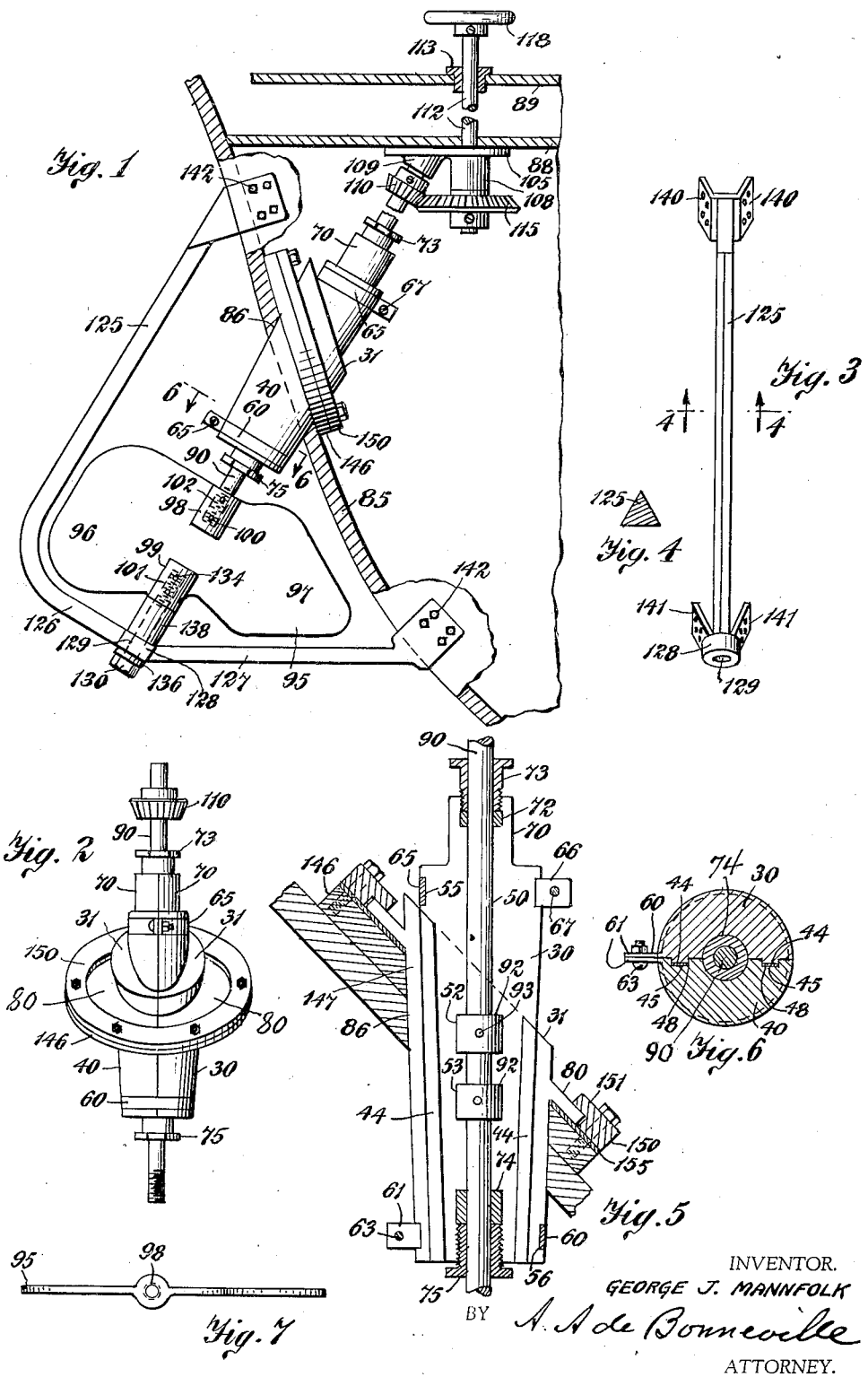
INVENTOR.
GEORGE J. MANNFOLK
BY A. A. de Bonneville
ATTORNEY.

Patented Apr. 18, 1939

2,155,055

UNITED STATES PATENT OFFICE 2,155,055

STEERING APPARATUS

George J. Mannfolk, New York, N. Y.

Application January 25, 1938, Serial No. 186,758

6 Claims. (Cl. 114—144)

This invention relates to steering apparatus.

The object of the invention is the production of a steering apparatus, having a rudder which can be easily attached or disconnected from the bow of a vessel.

The second object of the invention is the production of a steering apparatus for the bow of a vessel, and which can be connected to said bow with the rudder shaft extending through said bow without danger of leakage of water through the bow.

The third object of the invention is the production of a steering apparatus for the bow of a vessel, with means for protecting the rudder of the apparatus from any ice or other object in the water.

In the drawing, Fig. 1 represents a partial vertical section through the bow of a vessel with the steering apparatus in operative position; Fig. 2 shows a right hand view of a portion of Fig. 1; Fig. 3 indicates a left hand view of a portion of Fig. 1; Fig. 4 represents an enlarged section of Fig. 3 on the line 4, 4; Fig. 5 shows an enlarged view of one of the members of the housing with its appurtenance partly in section and a fragmentary portion of an enlarged section through the bow of the vessel; Fig. 6 indicates an enlarged section of Fig. 1 on the line 6, 6, and Fig. 7 shows a top view of the rudder of the steering apparatus viewed in the direction of its longitudinal axis.

The steering apparatus comprises a housing consisting of a pair of tapered members 30 and 40 having the upper end faces 31 inclined to the longitudinal axis of said members 39 and 40.

The members 30 and 40 are positioned opposite each other and extend through the opening 86 to be described.

The member 30 has a pair of longitudinal projections 44, and the member 40 has a pair of longitudinal recesses 45 that register with the projections 44. Strips of packing 48 are interposed between the projections 44 and the recesses 45. One half of a cylindrical longitudinal opening 50, is made in each of the members 30 and 40, and one half of a pair of similar cylindrical cavities 52 and 53 larger in diameter than the openings 50 and in line therewith are provided for the members 30 and 40. At the upper portion of both members of the housing is formed, on its outer surface, a groove 55 and at the lower portions of the members of the housing is formed a groove 56. In the groove 56 is detachably positioned a clamping strap 60 having a pair of projecting ends 61 which are clamped together by the bolt 63.

In the groove 55 is positioned a strap 65 having the projecting ends 66 with a bolt 67 respectively similar to 60, 61 and 63. By means of said straps and their bolts, the members 30 and 40 are tightly held together and the strips of packing 48 prevent any water entering between members of the housing. At the upper end of each of the members of the housing is shown a one-half portion 70 of a cylindrical projection. The said one-half portions 70 are bored for the packing 72 and are threaded for the gland 73 of a stuffing box. The lower portions of the members 30 and 40 are bored for the packing 74 and are threaded for the gland 75 of a stuffing box.

From each of the members 30 and 40 and at an angle thereto extend one-half portions 80 of a circular flange.

The numeral 85 indicates a section through the bow of the vessel with the tapered opening 86, and decks are shown at 88 and 89. The rudder shaft 90 extends through the opening 50 and has connected thereto the similar sleeves 92 by means of the pins 93. The sleeves 92 are seated in the cylindrical cavities 52 and 53, and thereby the rudder shaft 90 is maintained longitudinally in position.

The rudder of the steering apparatus is designated in its entirety by the numeral 95 and comprises the front portion 96 and the rear portion 97. A pair of similar cylindrical projecting hubs 98 and 99 are respectively integral with the upper and lower ends of the rudder 95. An interior thread 100 is provided for an opening in the hub 98 and an interior thread 101 is provided for the hub 99.

The lower end of the rudder shaft 90 is in threaded engagement with the thread 100 of the hub 98. Pins 102 extend through the hub 98 and the threaded lower end through the rudder shaft 90.

To the lower face of the deck 88 is fastened a journal bearing housing designated in its entirety by the numeral 105 and which has integral therewith the vertical bearing 108 and the inclined bearing 109. A mitre gear 110 is fastened to the upper end of the rudder shaft 90. A vertical shaft 112 extends through the gland 113 secured in the deck 89 and through the bearing 108 and has attached to its lower end the bevel gear 115 which is in mesh with the mitre gear 110. An operating wheel 118 is fastened to the upper end of the shaft 112.

To the outer face of the bow 85 is fastened a supporting bracket designated in its entirety by the numeral 125. The said supporting bracket is triangular in cross-section as shown in Fig. 4, and comprises the curved upper portion 126 and the lower horizontal portion 127. A boss 128 having an opening 129 joins the end portions 126 and 127. A screw bolt 130 extends through the opening 129 and its threaded shank is in threaded engagement with the interior thread 101 of the hub 99. Pins 134 extend through the hub 99 and the threaded shank of the screw bolt 130. A washer 136 is supported on the screw bolt 130 between its head and the boss 128, and a sleeve 138 is supported on the screw bolt 130, between the boss 129 and the hub 99. At the ends of the portions 126 and 127 are indicated similar angle shaped clamping members which respectively comprises the similar portions 140 and 141, that are fastened to sides of the vessel adjacent to the bow 85 by means of bolts 142.

To the inner face of the bow portion of the vessel is fastened a circular plate 146 of metal having an opening 147. To the plate 146 is detachably attached the circular clamping plate 150, which latter has extending from its inner face the circular clamping projection 151. The latter bears on the half portions 80 to detachably clamp them securely in place. A gasket 155 is interposed between the portions 80 and the plate 146 to prevent any water passing through the opening 86 of the bow 85. The members 30 and 40 extend through the openings 86 and 147.

To operate the steering apparatus the operating wheel 118 is turned and thereby the rudder shaft 90 is rotated in the desired direction and angle. The rudder 95 swings with the rotations of the shaft 90 in the usual way to steer the vessel. Additional gearing may be interposed between the shaft 112 and the rudder shaft 90 to swing the rudder 95 in the same direction as the operating wheel 118 is turned.

To disengage the rudder 95 from the rudder shaft 90 the pins 134 are removed from the hub 99 and the screw bolt 130 is unscrewed from said hub 99. The sleeve 138 and the washer 136 are then removed from the supporting bracket 125. Next the pins 102 are removed from the hub 98 and the rudder is swung to a position at right angles to that shown in Fig. 1. The operating wheel 118 is turned to disengage the lower threaded end of the rudder shaft 90 from the rudder 95, and the rudder can then be easily lifted from the supporting bracket 125.

By means of the supporting bracket 125 the rudder 95 is protected from any ice or other objects floating in the water.

Various modifications may be made in the invention and the present exemplification is to be taken as illustrative and not limitative thereof.

Having described my invention I claim:

1. In a steering apparatus the combination of a housing extending through the bow of a vessel, said housing comprising a pair of members, one of said members having a pair of longitudinal recesses and the other member having a pair of longitudinal projections adapted to enter said recesses, a strip of packing in each recess bearing against its coacting projection, means to clamp the members of the housing tightly together, a rudder shaft rotatively extending through the housing, a rudder secured to the lower end of rudder shaft and means to turn the rudder shaft.

2. In a steering apparatus the combination of a housing comprising tapered members extending through the bow of a vessel, means to tightly clamp the members of the housing together, a half portion of a cylindrical flange extending from each of the members of the housing at an angle thereto, a plate having an opening secured to the inner face of the bow portion of the vessel, the said housing extending through said opening, a circular clamping plate bearing on said half portions, a gasket positioned between said half portions and the plate secured to the inner face of the bow portion of the vessel, means to clamp the circular clamping plate to the plate secured to the inner face of the bow of the vessel, a rudder shaft extending through the housing, a rudder fastened to the lower end of said shaft and means to turn the rudder shaft.

3. In a steering apparatus for the bow of a vessel the combination of a housing comprising a pair of members extending through an opening in the bow of a vessel, means to clamp the members of the housing together, means to fasten the members of the housing to the bow of the vessel, a rudder shaft extending through the housing, means to turn the rudder shaft, a rudder having its upper end detachably fastened to said rudder shaft, a supporting bracket having its ends fastened to the outer face of the bow of the vessel, and a screw bolt connecting the lower end of the rudder and said supporting bracket.

4. In a steering apparatus for the bow of a vessel the combination of a housing comprising a pair of members extending through an opening in the bow of the vessel, each of said members having one half of a longitudinal cylindrical opening therein, and each member having one half of a cylindrical cavity in line with the longitudinal openings and larger in diameter than the latter, a stuffing box at each of the ends of the housing, a rudder shaft extending through the longitudinal openings of the members of the housing, sleeves fastened to the rudder shaft extending into the said cavities, means to clamp the members of the housing together and a rudder fastened to the lower end of the rudder shaft.

5. In a steering apparatus for the bow of a vessel the combination of a housing comprising a pair of members extending through an opening in the bow of said vessel, each of said members having a groove in its outer surface adjacent to its ends, a clamping strap in each of the grooves at the ends of the members to clamp the members of the housing to each other, a rudder shaft extending through the housing, a rudder fastened to the lower end of the shaft and means to turn the rudder shaft.

6. In a steering apparatus for the bow of a vessel the combination of a housing comprising a pair of members extending through an opening in the bow of said vessel, means to clamp the members of the housing tightly to each other, a rudder shaft extending through the housing, a rudder for the rudder shaft, said rudder having a cylindrical hub at its upper and at its lower end, each of said hubs having an opening with an interior thread, the lower end of the rudder shaft in threaded engagement with the hub at the upper end of the rudder, a supporting bracket for the rudder having its ends fastened to the bow of the vessel and a screw bolt extending through the supporting bracket and in threaded engagement with the hub at the lower end of the rudder and a sleeve encircling said screw bolt with its ends bearing between said supporting bracket and the hub at the lower end of the rudder.

GEORGE J. MANNFOLK.